United States Patent [19]
Durst et al.

[11] Patent Number: 5,933,829
[45] Date of Patent: Aug. 3, 1999

[54] AUTOMATIC ACCESS OF ELECTRONIC INFORMATION THROUGH SECURE MACHINE-READABLE CODES ON PRINTED DOCUMENTS

[75] Inventors: Robert T. Durst; Kevin Hunter, both of Fort Myers, Fla.

[73] Assignee: NeoMedia Technologies, Inc., Fort Myers, Fla.

[21] Appl. No.: 08/967,383

[22] Filed: Nov. 8, 1997

Related U.S. Application Data

[60] Provisional application No. 60/030,166, Nov. 8, 1996.
[51] Int. Cl.[6] .................................................. G06F 17/00
[52] U.S. Cl. ................................................. 707/10; 707/3
[58] Field of Search ....................... 707/10, 514; 705/26, 705/3; 235/462; 380/25; 463/41; 395/200.3, 766

[56] References Cited

U.S. PATENT DOCUMENTS

| | | | |
|---|---|---|---|
| 5,304,786 | 4/1994 | Pavlidis et al. | 235/462 |
| 5,649,186 | 7/1997 | Ferguson | 707/10 |
| 5,671,282 | 9/1997 | Wolff et al. | 380/25 |
| 5,682,540 | 10/1997 | Klotz, Jr. et al. | 395/766 |
| 5,710,887 | 1/1998 | Chelliah et al. | 705/26 |
| 5,745,681 | 4/1998 | Levine et al. | 395/200.3 |
| 5,757,917 | 5/1998 | Rose et al. | 380/25 |
| 5,765,176 | 6/1998 | Bloomberg | 707/514 |
| 5,778,367 | 7/1998 | Wesinger, Jr. et al. | 707/10 |
| 5,791,991 | 8/1998 | Small | 463/41 |
| 5,848,413 | 12/1998 | Wolff | 707/10 |

FOREIGN PATENT DOCUMENTS

| | | |
|---|---|---|
| WO98/24036 | 6/1998 | WIPO . |
| WO98/24050 | 6/1998 | WIPO . |
| WO98/40823 | 9/1998 | WIPO . |
| WO98/49813 | 11/1998 | WIPO . |

*Primary Examiner*—Wayne Amsbury
*Assistant Examiner*—Thuy Pardo
*Attorney, Agent, or Firm*—Anthony R. Barkume, P.C.

[57] ABSTRACT

The present invention is a secure system and method for providing automated access to electronic information stored in a database in either a local or remote location. The system utilizes a machine-readable code printed on a document, referred to herein as an intelligent document since it stores information used to automatically access the information. The machine-readable symbol is encoded with source data (including a file location pointer) that is first obfuscated by generating a checksum of the source data, encrypting the source data by using the checksum as an encryption key, and assembling the checksum with the encrypted source data prior to encoding. The machine-readable symbol is then printed and distributed by the vendor by any logical means to the end user. The end user then scans the code via appropriate code scanning (e.g. bar code scanning) equipment, and de-obfuscates the scanned data by parsing the checksum, decrypting the remainder of the scanned data string (which includes the file location pointer) using the parsed checksum as a decryption key, computing a checksum of the decrypted data string, and comparing the computed checksum with the parsed checksum to determine the validity of the code. The file location pointer is then used to access the appropriate file. In a preferred embodiment, a Web browser program is launched, and the URL of the vendor's Web site is accessed through the Internet.

58 Claims, 10 Drawing Sheets

AUTOMATIC ACCESS OF ELECTRONIC INFORMATION THROUGH SECURE MACHINE-READABLE CODES ON PRINTED DOCUMENTS

CROSS-REFERENCE TO RELATED APPLICATION

This application is based on and claims the priority of co-pending provisional patent application filed in the United States Patent and Trademark Office on Nov. 8, 1996 and assigned Ser. No. 60/030,166.

BACKGROUND OF THE INVENTION

Electronic data sources, such as conventional databases, the Internet (i.e., the World Wide Web("WWW")) are a rich and important means of information retrieval and distribution and, increasingly, electronic commerce. However, there are problems finding the information desired in this increasingly complex and changing network of data sources. Recently introduced Internet "search engines", such as YAHOO, help by allowing a user to search on-line indices of information sources, and even full source text, for relevant key words and phrases related to their topic of interest, but even carefully structured queries by experienced users often results in hundreds and even thousands of possible "hits" which are not sufficiently specific to preclude further manual search which is both data resource inefficient and time consuming.

Because of these inefficiencies, as well as general lack of familiarity with search engines and their syntax, users often rely on human readable print and broadcast media advertising to identify source addresses (e.g., Uniform Resource Locators ("URLs")) for Web sites and other online information of interest. Print media is particularly effective since: (1) it is the most ubiquitous method of communication and advertising in the modern world; and (2) a printed document can serve as a persistent reference to be saved and used during a subsequent on-line session.

However, human readable printed source addresses, and especially URL's, are particularly difficult to manually enter in software programs, such as web browsers, due to their length and use of complex and unfamiliar symbols. If the characters in a URL are not entered exactly, retrieval is prevented or, in a limited number of cases, a legal but incorrect source is accessed. This is especially true when URLs incorporate foreign languages and/or complex query instructions to on-line databases, as is increasingly frequent in most Web sites. In addition, the inability to type or otherwise manually enter symbolic address information due to either disability or lack of training complicates use of on-line information resources such as the Internet for millions of individuals.

Finally, it is widely anticipated that Internet access will increasingly be provided through interactive cable television via Web-ready television receivers and set-top boxes used in conjunction with conventional television receivers. In this home entertainment environment, it is difficult to use keyboards for address entry due to both lack of typing skill and the cumbersome placement of these components. Another method which would eliminate typing and allow users to directly link printed addresses and query scripts to electronic information sources would be highly desirable.

Companies that host Web sites for the purpose of providing information such as advertising, often want to know the identity and other related information of the users who visit their sites (i.e., download files therefrom). It would be quite advantageous to provide such companies or vendors with this information as part of a specific file transfer request, e.g., as part of a CGI parameters string included in a URL. Additionally, it would be desirable to be able to effect a secure manner of transferring this information, so that a user would have confidence in the system and thus send sensitive information such as a credit card number or the like with the file transfer request. This would enable electronic commerce to flourish well beyond the point it exists today.

SUMMARY OF THE INVENTION

The present invention is a system and method for providing automated access to electronic information stored in a database in either a local or remote location. The system utilizes a machine-readable code printed on a document, referred to herein as an intelligent document since it stores information used to automatically access the information. The machine-readable symbol comprises encoded source data, wherein the source data comprises application launch information as well as file location information. The source data is encoded and printed, and then distributed by the vendor by any logical means to the end user. The end user then scans the code via appropriate code scanning (e.g. bar code scanning) equipment, decodes the raw decoded data, and the file location information is then used to access the appropriate file. In a preferred embodiment, a Web browser program is launched, and the URL of the vendor's Web site is accessed through the Internet. Local file retrieval may also be implemented on the client computer itself, as well as over an intranet or LAN environment. Additional user-specific demographic data such as the user's name and address may also be encoded in the machine-readable code when the document is specifically tailored for individual targeting, such as mailing labels. This demographic information is uploaded to the WWW site for use by the vendor. In addition, the present invention encodes security data, such as an encryption key, for use in secure data transmissions such as electronic commerce over the Internet.

In particular, the present invention is a method and system for a computer, such as a client computer in a networked computer system, to retrieve a computer file in which a symbol data string comprising a file location pointer is encoded into a machine readable symbol such as a two-dimensional bar code symbol, and the machine readable symbol is rendered within a data carrier (e.g. printed on an intelligent document). A computer input device such as a two-dimensional bar code scanner is coupled to the client computer and transposes an input data string from the machine readable symbol. The computer parses the input data string to determine the file location pointer, and the file location pointer is then utilized pointer to request the computer file designated thereby.

The file location pointer may be utilized to request the computer file by either passing it to an application program on the client computer suitable for processing the corresponding computer file, and then the application program retrieving the computer file from the specified file location. Alternatively, the file location pointer may be utilized to request the computer file by retrieving a copy of the computer file from the specified file location, and then invoking an application program on the client computer suitable for processing the corresponding computer file.

The client computer assembles a computer file transfer request word including the file location pointer and transmits the request word to a target server computer over a computer network system, which may be a wide area network such as the Internet or a local area network (LAN) or intranet. The file location pointer may alternatively specify the location of a computer file stored in a local memory resident in the client computer rather than on a target server computer. When the computer file to be retrieved is on a target server computer on a network, then the file location pointer is a network address associated with the target server computer and a file identifier correlated to the computer file requested by said client computer. In particular, when utilizing the Internet, the file location pointer may be in the form of a uniform resource locator (URL). In any type of networked environment, the target server computer receives the computer file transfer request word and transmits a computer file to the client computer in response thereto.

In addition to the file location pointer, the present invention takes advantage of the information density of the two-dimensional symbology by encoding a source identifier data string within the machine readable symbol. The source identifier data string is used to denote the particular source of the data carrier such as a particular magazine or ad, or can be used to denote an expected user or targeted group of users of the data carrier. The source identifier string is then transposed by the client computer, assembled within the computer file transfer request word, and transmitted to the target server computer. The target server computer stores the source identifier data string received from the client computer in the computer file transfer request word.

Additionally, the machine readable symbol also has encoded therein an encryption key associated with the source identifier data string, which is also transposed by the computer input device. The encryption key is used by the client computer to encrypt information specific to a user of the client computer, and the encrypted user information is assembled within the computer file transfer request word and transmitted to the target server computer. The information specific to a user may be obtained, prior to encryption, from a user information data file stored on the client computer, or it may be obtained from user demographics data correlated to a targeted user of the data carrier that had been previously encoded within and transposed from the machine readable symbol.

The target server computer may then utilize the source identifier data string received as part of the file transfer request word to access a lookup table to determine a decryption key, and then decrypt the encrypted user information received said client computer in the file transfer request word. The lookup table may either be stored locally on the target server computer, or it may be stored remotely on a secondary server computer.

The decrypted user information may comprise sensitive user information such as a credit card number associated with the user of said client computer, thus enabling on online electronic commercial transaction by utilizing the credit card number. The user demographics data may be used by the target server computer to determine the file to transmit to the client computer; i.e. certain files may be targeted to specific users of the system.

The machine-readable symbol may also have encoded therein an executable command to launch a software utility resident on the client computer, and the software utility is then automatically launched after the machine readable symbol is transposed. For example, the software utility may be an Internet browser program or a word processing program. In addition, specific functions may also be encoded in the machine readable symbol along with the application launch command, such as a command to execute a print job of the retrieved computer file.

The symbol data string may optionally be obfuscated prior to being encoded into the machine readable symbol, in which case the input string transposed must likewise be de-obfuscated by the client computer. The obfuscation may be by computing a checksum of the symbol data string, encrypting the symbol data string by utilizing the checksum as an encryption key, and assembling the checksum with the encrypted symbol data string prior to encoding into the machine readable symbol. The de-obfuscation would then be accomplished by parsing the input data string to determine the checksum, decrypting the encrypted symbol data string with the checksum as a decryption key, computing a checksum of the decrypted symbol data string, and comparing the computed checksum with the checksum from said input data string. A valid data condition would be indicated when the comparison step is successful; and an invalid data condition would be indicated when the comparison step is unsuccessful.

DETAILED DESCRIPTION OF THE PREFERRED EMBODIMENT

Figure 1:
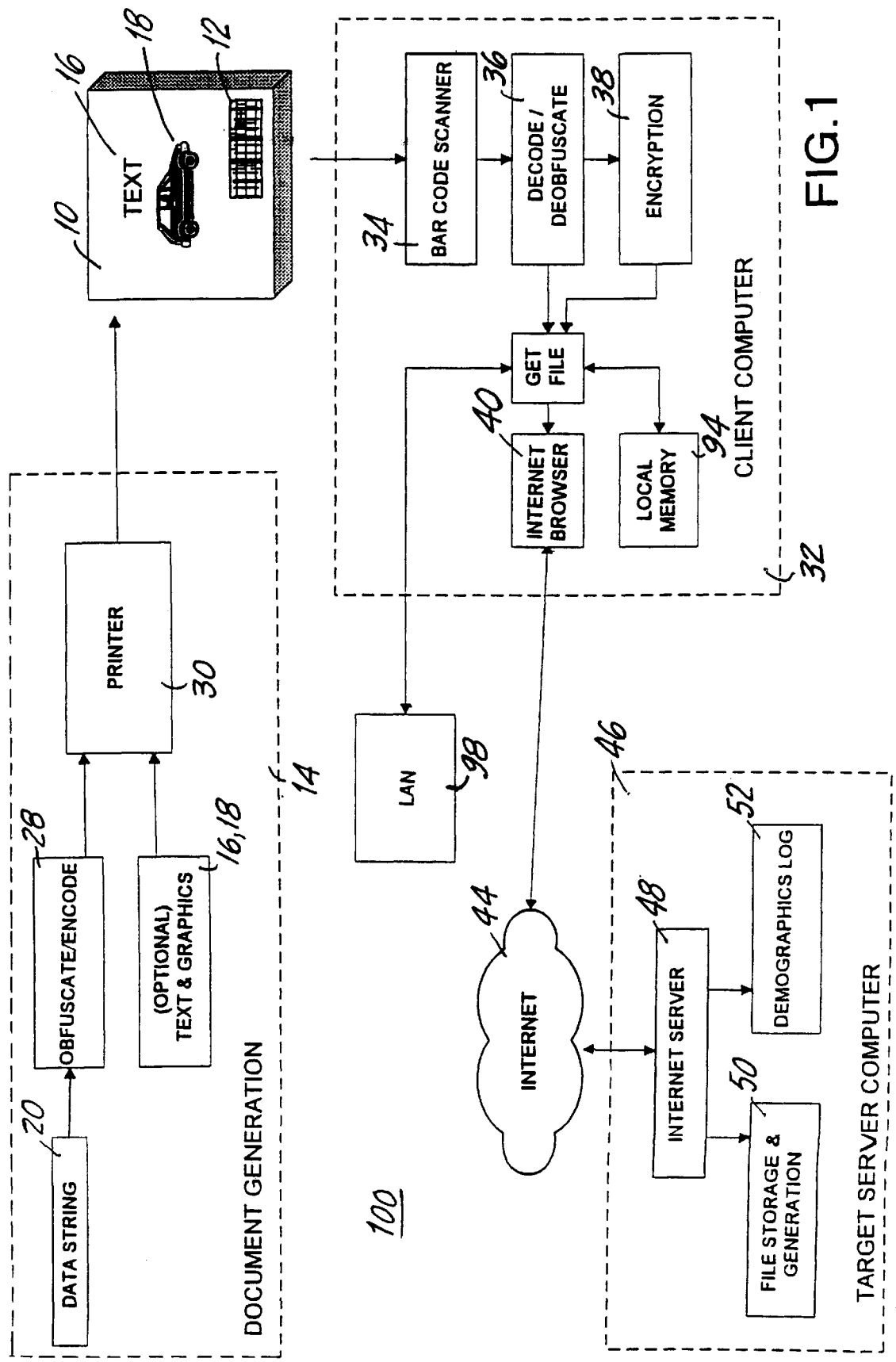
FIG. 1 is a diagram of the system of the present invention.

The system 100 of the present invention for generating and reading an intelligent document 10 is illustrated in block diagram form in FIG. 1. The system 100 comprises an intelligent document generation system 14, which encodes, assembles and prints an intelligent document 10 for subsequent scanning at a client computer.

The system operates as follows: A vendor who wishes to provide an intelligent document 10 programs certain parameters into a data string 20 which will be encoded within a machine-readable code 12 and printed on the document along with text 16 or graphics 18. The document may be an advertisement in the form of a magazine insert or page, a brochure, a label for an envelope, a memorandum, and the like.

Figure 2:
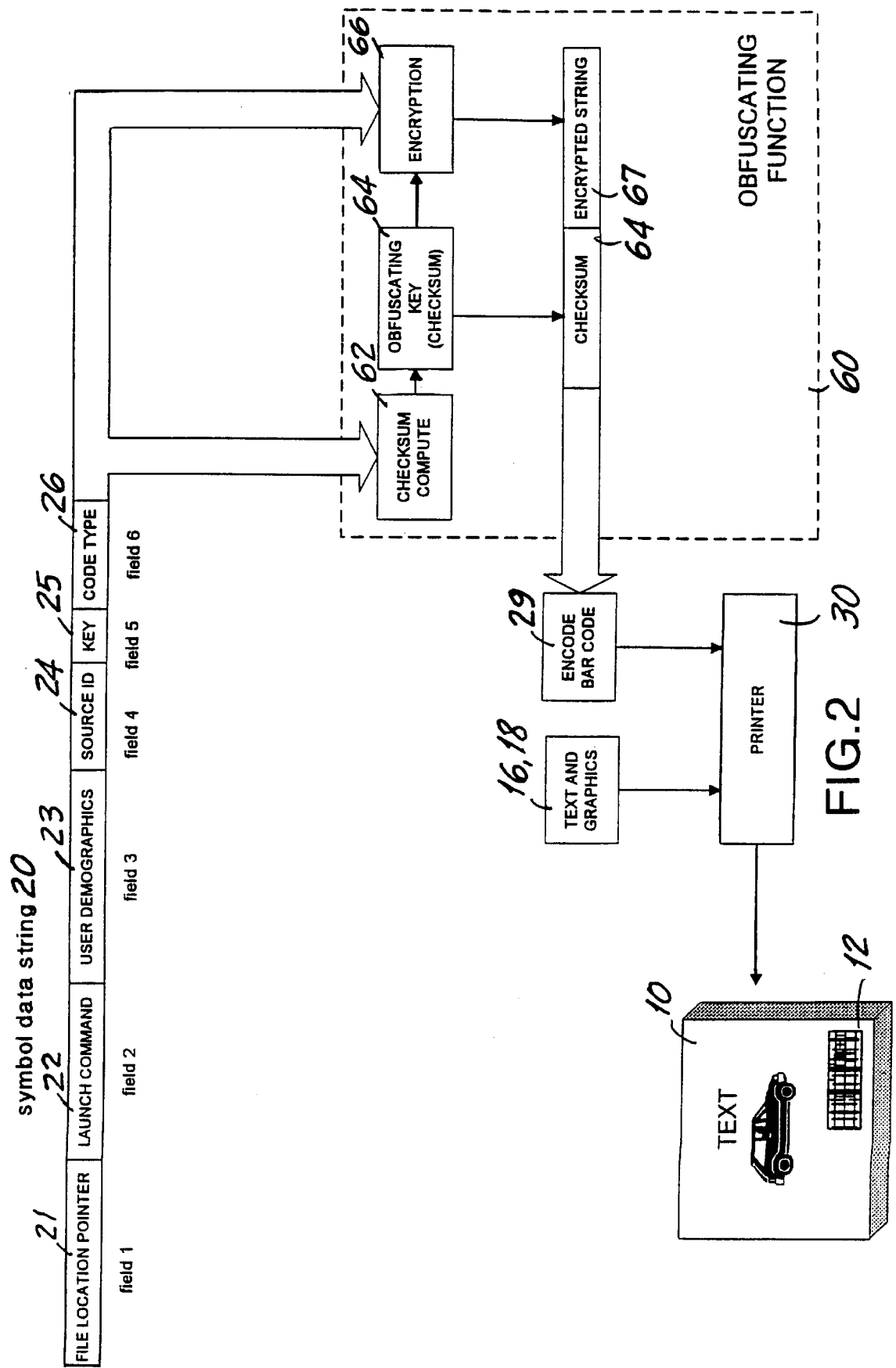
FIG. 2 is a diagram of the document generation function of FIG. 1.
Figure 3:
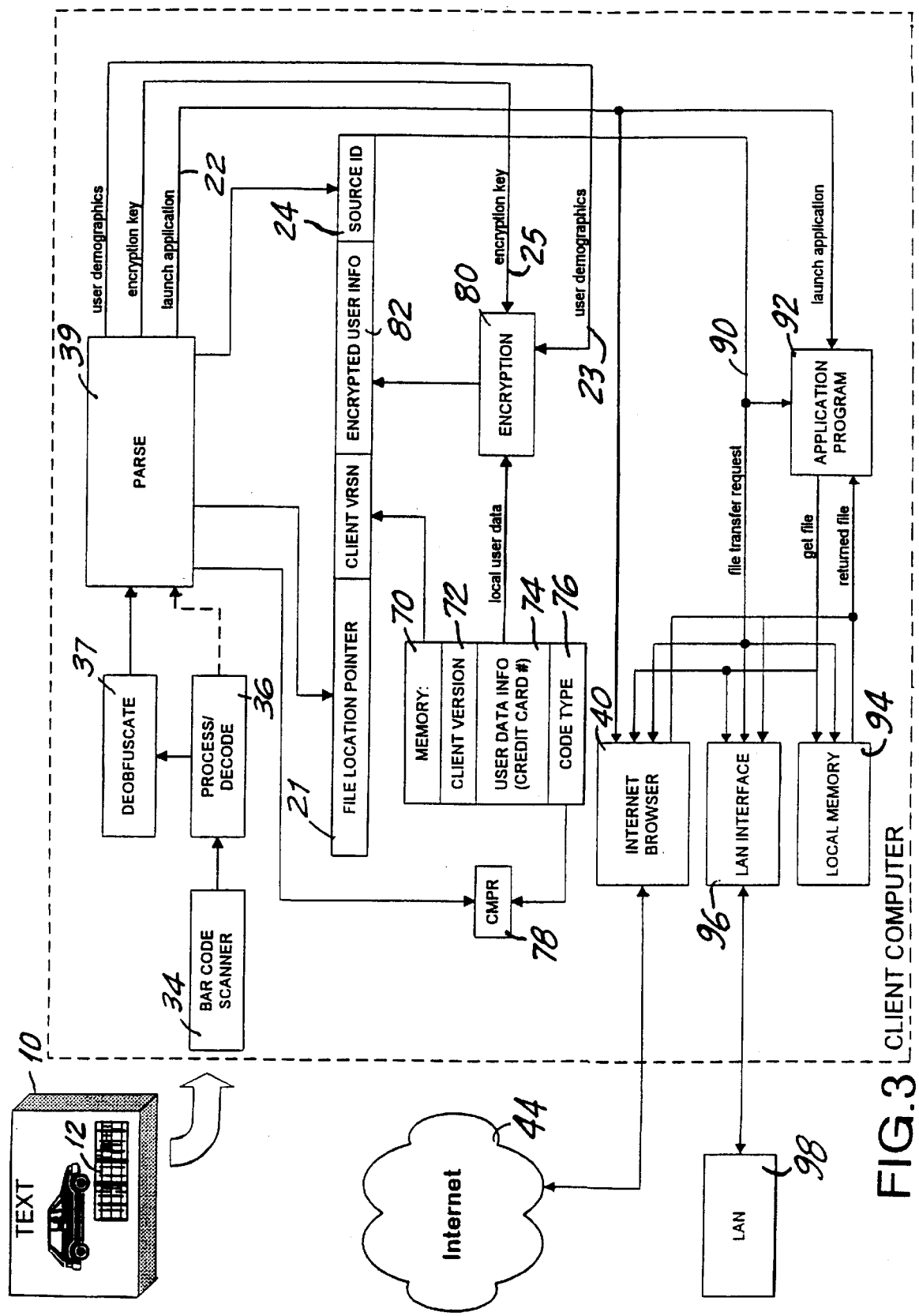
FIG. 3 is a diagram of the client computer functions of FIG. 1.

Parameters to be included within the machine-readable code depend upon the application desired by the vendor. FIG. 2 illustrates fields 1–6 of the symbol data string 20, which may comprise a file location pointer 21, a launch command 22, a user demographics field 23, a source identifier 24, an encryption key 25, and/or a code type field 26. For example, if the vendor wants the end-user to be able to access the vendor's Web site automatically upon scanning the symbol 12, then the parameters included in the machine-readable symbol may include the launch command 22 to launch an Internet browser application, such as NETSCAPE, and a Uniform Resource Location (URL) code into the file location pointer 21, such as http://www.xyzcorp.com. This information is encoded in accordance with the particular type of machine code being used. For example, one type of code which may be used by the present invention is a PDF417 symbol, which is described in detail in U.S. Pat. No. 5,304,786, which is incorporated by reference herein. The PDF417 symbol, known as a two-dimensional bar code symbol, has enough storage information to encode the browser launch command as well as the full URL.

A printer 30 then utilizes the encoded data and desired text and graphics to print an intelligent document 10 a shown in the Figures. The symbol data string 20 may also be obfuscated for security purposes, which will be described in detail below.

The intelligent document 10 is disseminated to the end user in accordance with the methods desired by the vendor. For example, if the intelligent document 10 is a magazine advertisement, then the user will obtain the magazine by conventional means such as purchase at a retail outlet, the mail, etc.

The user, after reading the text and graphics in the document, can access the Web site of the vendor by utilizing a scanner 34 in conjunction with his client computer 32, programmed with appropriate software in accordance with the invention. That is, the user will optically scan the code 12 with an optical scanner. An optical scanner sufficient to scan bar code symbols and the like is disclosed in U.S. Pat. No. 5,448,050, which is incorporated herein by reference. The device disclosed in the '050 patent is housed within a mouse type device, thus also including circuitry useful in point-and-click applications popular in personal computer platforms today.

After the two-dimensional bar code data is scanned by the scanner 34, a decoder 36 is used to decode the raw data into usable commands and data. The decoder is typically a software program executed by the microprocessor of the computer, and provides thereby to an Internet browser 40 the URL which had been encoded by the vendor into the symbol 12. The browser 40 application is then loaded (if not already running on the computer 32) by the launch command, and the URL is used to access the Web site of the vendor accordingly at the target server computer 46 via the Internet 44. As a result, the user may automatically access the vendor's Web site to obtain a computer file therein without having to enter the URL by a keyboard, thus eliminating all chances of error due to manual data input. The requested file is obtained from file storage and generation means 50, and sent to the client computer via the Internet for display to the user on the browser 40.

The above scenario is useful when a vendor prints and distributes such intelligent documents on a mass scale. That is, the symbol 12 distributed is the same for each user. In an alternative embodiment, specific demographic information is included with the code to provide for personalized operation as follows. This scenario is useful when the vendor makes individual printings keyed to individual users, such as when mailing labels are printed for inclusion on an envelope surrounding a magazine or the like.

In this case, the vendor may include in the user demographics field 23 personal data such as the user's name, location, phone number, and other appropriate demographic information. When the user scans the document and accesses the Web site, the personal data is uploaded to the target server, thus providing the vendor with useful demographic data as to which user's have actually utilized the intelligent document scanning service.

The code may also include security information useful in completing secure transfers across the Internet. For example, an encryption key 25 appropriate in a public or private key system may be embedded within the symbol 12. An appropriate software routine in the user's computer utilizes the key after decoding it in order to encrypt certain data being sent across the Internet. For example, the encryption of credit card information is desired in order to thwart would-be intruders from misappropriating the information. The system of the present invention could be used to allow the user to order an item advertised in the brochure by taking the credit card number, already resident in the user's computer memory, and encrypting it with the key decoded from the code. When the user desires to purchase the item, he scans the associated code, and the credit card number is encrypted and transmitted as the Web site is accessed. The target server computer can match the source identifier string 24 sent with the transmission with the appropriate decryption key stored in a lookup table at the target server or on an external computer, and decrypt the credit card number accordingly.

The system 10 of the present invention has additional embodiments which allow quick and easy retrieval of a data file on an intranet or Local Area Network (LAN). Thus, a department of a company may distribute fliers regarding certain events, new products, etc., and encode appropriate document access information in accordance with the teachings of the invention. The user may obtain further information by scanning the code on the document, which then causes his computer to access his network, file server, etc.

This embodiment is also useful in a small office environment, where a user prints out documents such as letters or memos that may need to be revised at a later date. It is common practice to manually type in the drive location of the document in the lower corner of the document to allow the user to easily access the document at a later date, without searching through massive amounts of files. Thus, a user may type in the text "c:\user\files\smith\clients\letters\xyzcorp\jonesltr\dec12" to indicate its location on his drive. When he desires to edit or otherwise access the document, he would, in the prior art, have to type in the entire location after launching the proper application (e.g. word processor). In accordance with the teachings of the present invention, a machine readable code may be encoded with this information as the file location pointer (as well as a command to launch the application) and printed on the document. When the user later desires to edit the document, he scans the code. The code is decoded, the application is launched, and the file is fetched from the location specified in the code.

The invention will now be described in further detail.

FIG. 2 is an illustration of the obfuscation function of the present invention. Prior to being encoded, the symbol data string may optionally be obfuscated in order to improve the security aspects of the system. The symbol data string is input into a checksum computing means 62, which then computes the checksum of the symbol data string in accordance with teachings well known in the prior art. The computed checksum is then used as a key in an encryption scheme 66 which may be one of several well known encryption methodologies known in the prior art. The key 64 is assembled in the clear (i.e., unencrypted) along with the encrypted symbol data string into by the encoding function 29. After this encrypted data string and cleared checksum data is encoded, it is rendered by the printer 30 in accordance with methods well known in the art and the intelligent document is thereby generated.

Figure 4:
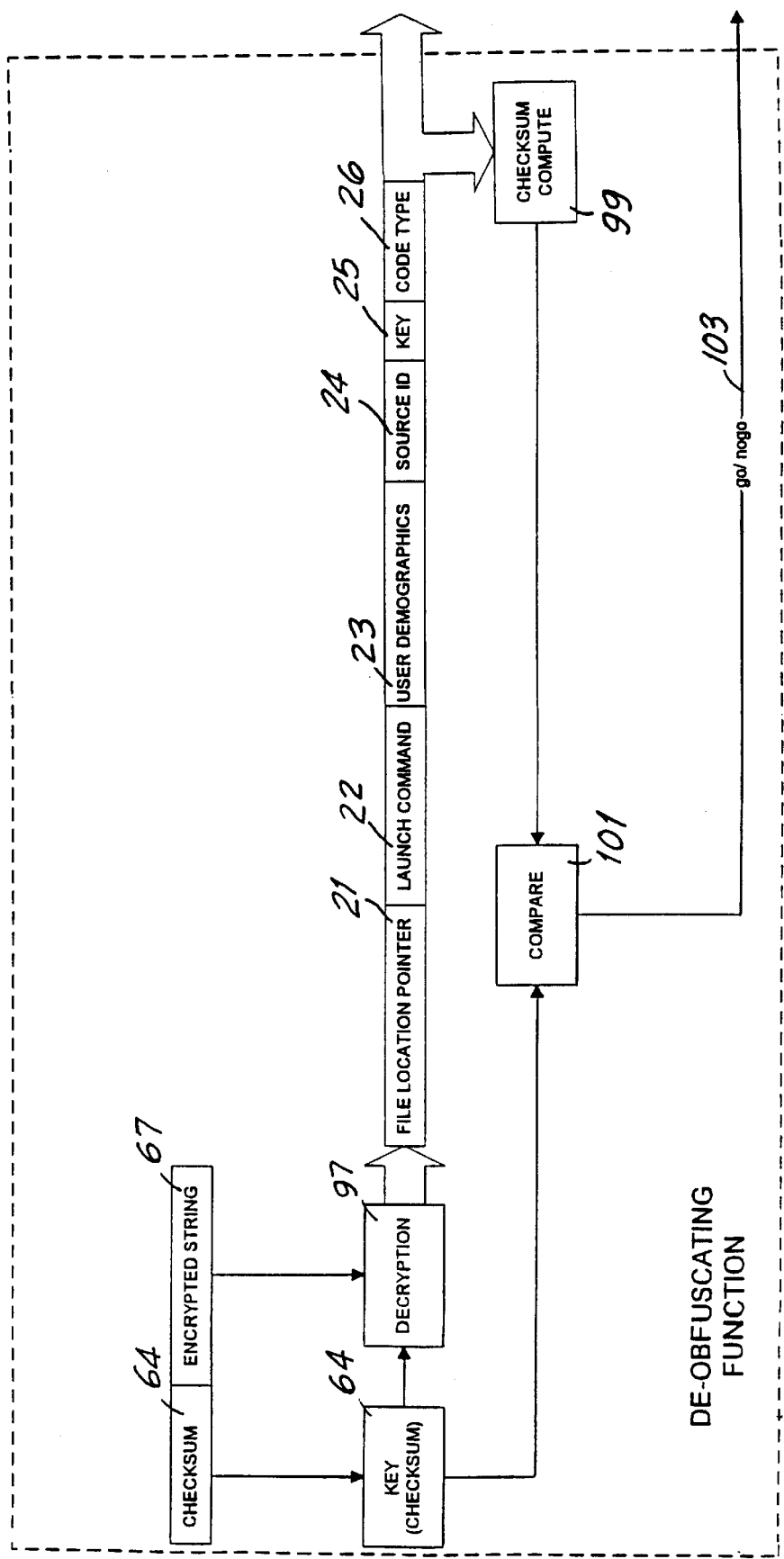
FIG. 4 is a diagram of the deobfuscating function carried out by the client computer of FIG. 3.

After the intelligent document 10 is distributed to the user, the bar code symbol 12 is scanned by bar code scanner 34 and processed as follows. The scanned symbol data is decoded by means well known in the art in accordance with the particular symbology implemented to encode the symbol 12. Once the symbol data has been decoded, it is deobfuscated (if the original symbol data had been obfuscated as described above) by deobfuscation function 37 which is illustrated in detail in FIG. 4. First, the clear checksum 64 is utilized as a key to decryption function 97 to decrypt the encrypted string 67. The decryption function 97 which was preloaded onto the client computer as part of an initialization process with the system is a corollary to the encryption function 66. By passing the checksum 64 in the clear and utilizing it as the key, it enables the client computer and document generation computing means to be synchronous with respect to the encryption methodology. After the decryption function 97 produces the clear data string comprising the original file location pointer 21, launch command 22, user demographics 23, source ID 24, key 25 and code type 26, then the checksum computing means 99 operates to compute a checksum of those fields. That computed checksum is then compared by comparison block 101 with the received clear checksum 64 that was decoded by the decoding process 36. If the comparison process 101 indicates that the computed checksum equals the received clear checksum, then go/no go signal 103 indicates that the data transmission and decryption process was successful. If, however, the checksums are not favorably compared, then the go/no go signal 103 will indicate an unsuccessful transmission and decryption process. If this is unsuccessful, then further processing is aborted.

Once the symbol data is deobfuscated, it is then parsed by parsing block 39 in order to utilize the constituent fields as follows. The file location pointer 21 and source identifier string 24 are assembled into a register that will comprise the file transfer request. The file transfer request register is also loaded with a client version 72 taken from local memory 70 on the client computer. The user demographic string 23 is optionally fed into an encryption block 80 which is then used with encryption key 25 to encrypt that data and put the results as encrypted user information 82 into the file transfer request string 90. Optionally, the encryption function 80 may utilize certain local user data 74 that had been stored on the memory 70 of the client computer. This local user data may comprise sensitive information, such as the user's credit card number. Advantageously by encrypting this information the user will have a higher level of confidence that this sensitive information can be transmitted over the Internet for applications such as electronic commerce. Thus, the file transfer request register 90 will comprise the file location pointer 21, the client version 72, certain encrypted user information 82 and the source identifier 22.

The code type string 26 is compared by block 78 to the internally stored code type 76. If the comparison is unsuccessful, then further processing is aborted. This process is useful to enable certain versions of the client software to be distributed such as on a demonstration or trial basis, and this trial software will only work with certain documents generated by corresponding document generation software modules. Thus, a user having a trial version will not be able to fully utilize the system until it purchases by license or otherwise the production version. Utilization of this type of code type matching also enables the system vendor to control expired licenses, etc.

Once the file transfer request has been successfully assembled, it is then sent to the appropriate interface in order to obtain the requested file. In the preferred embodiment, the file transfer request will take the form of a uniform resource locator (URL) which will be sent to the Internet browser software 40 that is resident and on the client computer. Optionally, if the file transfer request string indicates that the file is located on a Local Area Network such as LAN 98, then the file transfer request will be transmitted through the LAN interface 96 of the client computer in order to obtain the correct file. Further optionally as described above, the file transfer request may seek to obtain a file stored in local memory, such as on the user's hard drive 94.

Figure 5:
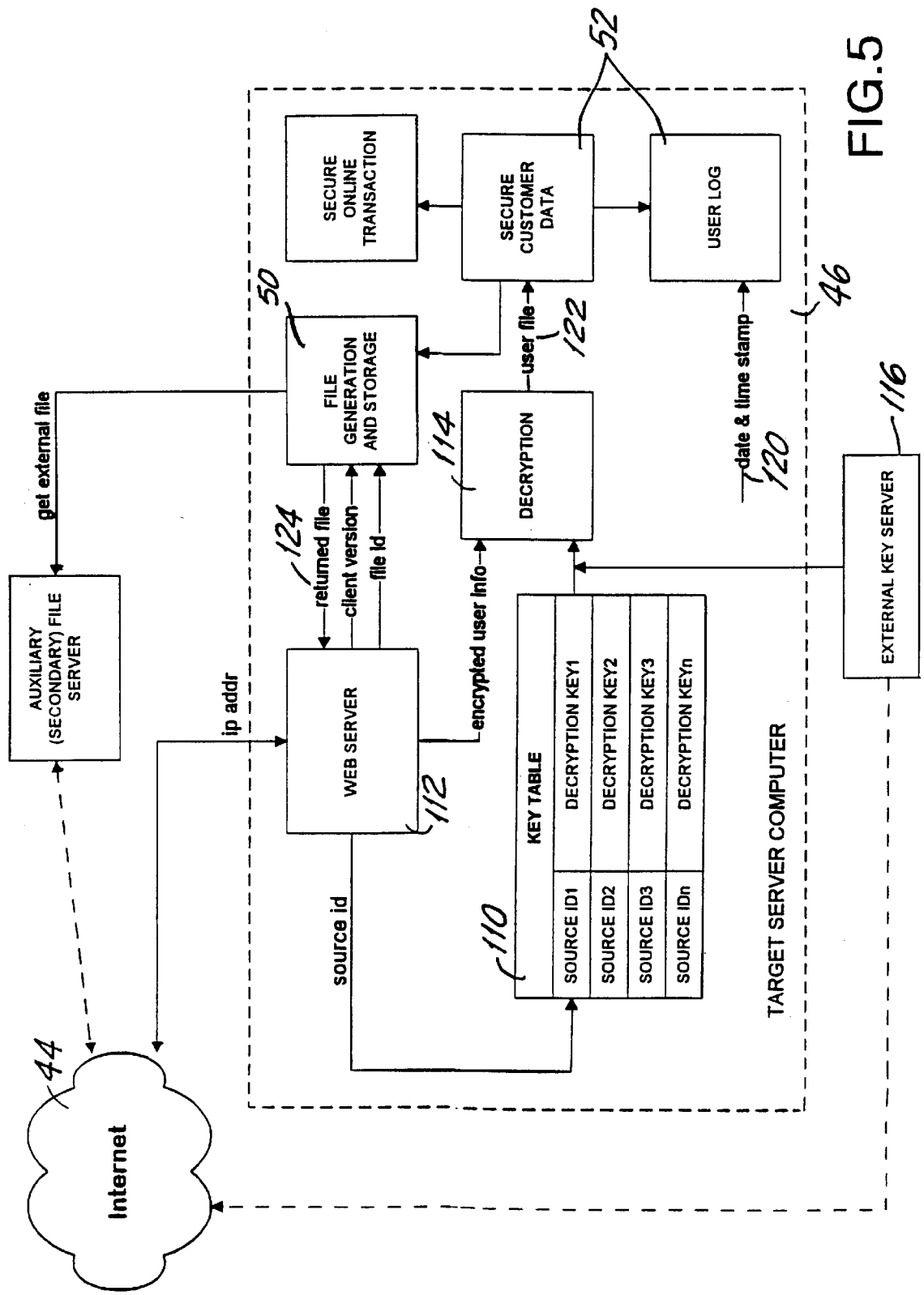
FIG. 5 is a diagram of the target server computer of FIG. 1.

Referring to FIG. 5, the operation of the target server computer will now be described in detail. When the file transfer request 90 indicates that the file to be retrieved is located on an Internet file server, then the file location pointer 21 will comprise a URL, which comprises an IP address (Internet Protocol), as well as a file identifier. The IP address, as is well known in the art, is the address of the target server computer on the Internet. The Web server program 112 that is running on the target server computer 46 receives the URL over the Internet 44 and strips out certain parameters contained therein. The source identifier 24 is used to access a look up table 110 which comprises a plurality of source identifier strings and their associated decryption keys. This decryption key that is obtained from the key table 110 is then used by decryption block 114 to decrypt the encrypted user information received in the file transfer request. Decryption function 114 is corollary to the encryption function 80 performed at the client computer. Thus, the secure information transferred with the file transfer request is decrypted and user information file 122 may be stored in user log 52, along with the date and time stamp 120 to indicate when the particular request was received. This information is quite valuable to the vendor, since it enables it to determine the name and other useful information relating to users who have accessed its Web site. This information may also be utilized by file generation and storage means 50 to dynamically determine the file or files to be sent back to the client computer. For example, if the demographics data indicates that the user would prefer the file returned back in a language other than English, that file can be accessed or generated appropriately. Thus, in addition to retrieving a static page stored in the target server computer, the system of the present invention allows dynamic generation and return of computer files in accordance with user's preferences indicated in the transfer request. In addition, as described herein, if the user has allowed his credit card number to be encrypted and sent with the file transfer request, then the target server computer can decrypt the credit card number and utilize it to perform a secure on-line transaction.

In the alternative to having a file resident on the target server computer, it may be required for the target server computer to access an auxilliary file server 118 to get the external file and return it back to the client computer. The auxilliary file server 118 may be accessed directly, through a dial up modem connection, or through the Internet. In addition, an external key server 116 is accessible by the target server computer if it is desired by the system designer to keep the key table 110 remote from the target server computer, rather than local therein. By keeping a key table 110 at a central server location, the system provider can keep track of server requests to decrypt user information and charge a fee accordingly. Thus, a vendor utilizing this system may have the option of paying a "per click" fee to determine the user demographics of each user that accesses his server or may just provide files back to the user without obtaining that knowledge on a less costly basis.

When the file is returned back to the client computer through the Internet 44, it may be displayed in a manner well known in the art on the Internet browser 40. Thus, the system of the present invention has provided an easy and error proof way for a user to obtain a computer file from an Internet server computer by simply scanning a code provided on an intelligent document and having the client automatically process the code, request the file wherein the file is then returned by the target server computer and displayed to the user.

Figure 6:
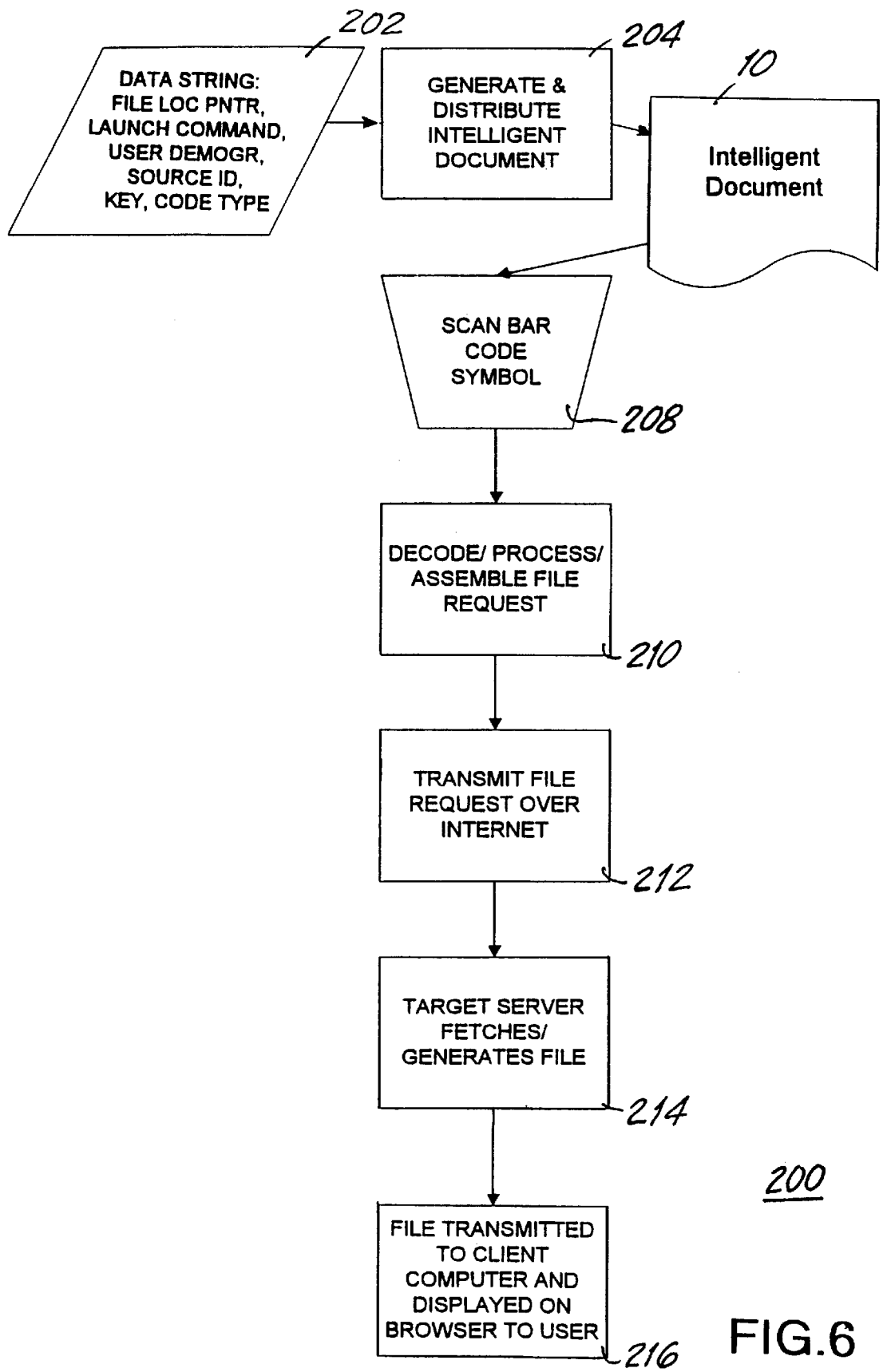
FIG. 6 is a top level flowchart of the method of the present invention.

FIGS. 6 through 10 illustrate the flowcharts of the methodologies employed by the present invention. FIG. 6 is an overall flowchart wherein step 202 illustrates the data string comprising the file location pointer, launch command, user demographics, source identifier, key and code type. At block 204, the data string is utilized to generate an intelligent document 10 which is also distributed to the end users. At step 208, the bar code symbol is scanned, and at step 210 the data is decoded and processed and the file request is assembled. At step 212 the file request is transmitted over the Internet and at step 214 the target server fetches and/or generates the computer file requested. Finally, at step 216 the file is transmitted to the client computer and displayed on the browser to the user.

Figure 7:
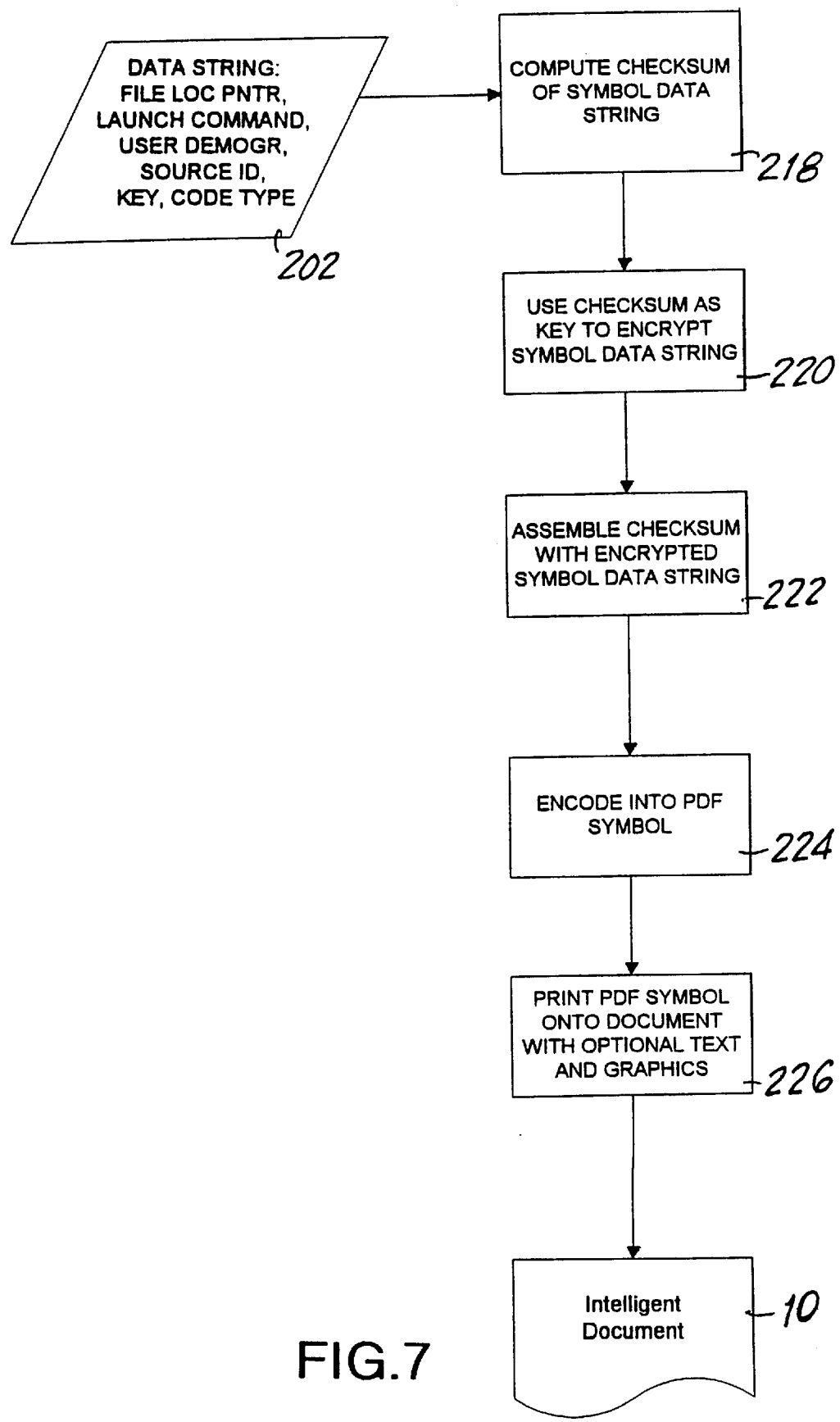
FIG. 7 is a flowchart of the document generation of the present invention.

FIG. 7 is a more detailed flowchart of the document generation procedure. The data string at 202 is used to compute a checksum at step 218. At step 220, the checksum is used to encrypt the data string and at step 222 the checksum and encrypted data string are assembled. At step 224 the bar code symbol is encoded and at step 226 the bar code symbol is printed with optional text and graphics onto the intelligent document 10.

Figure 8:
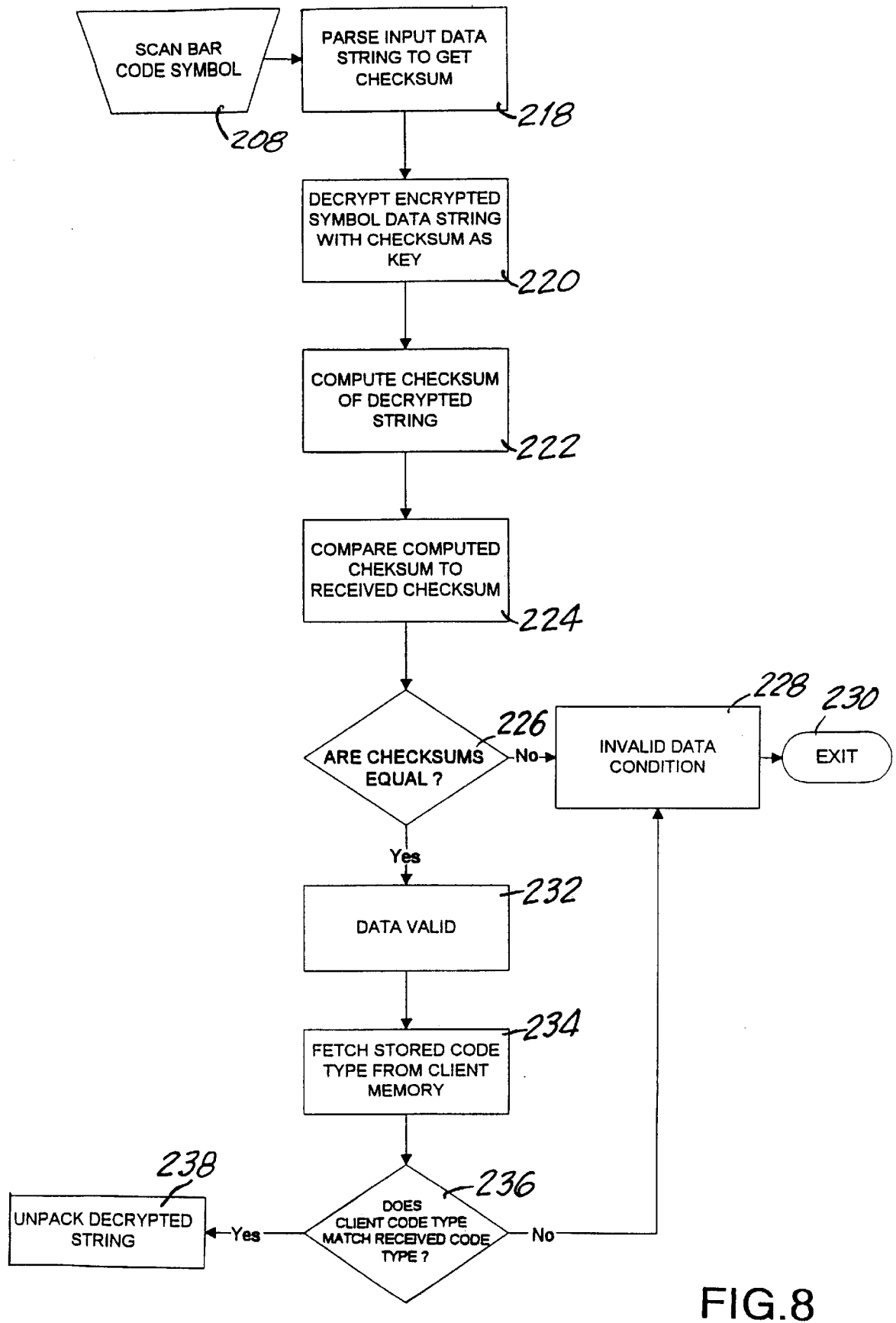
FIGS. 8 and 9 are a flowchart of the scanning and processing by the client computer of the present invention.
Figure 9:
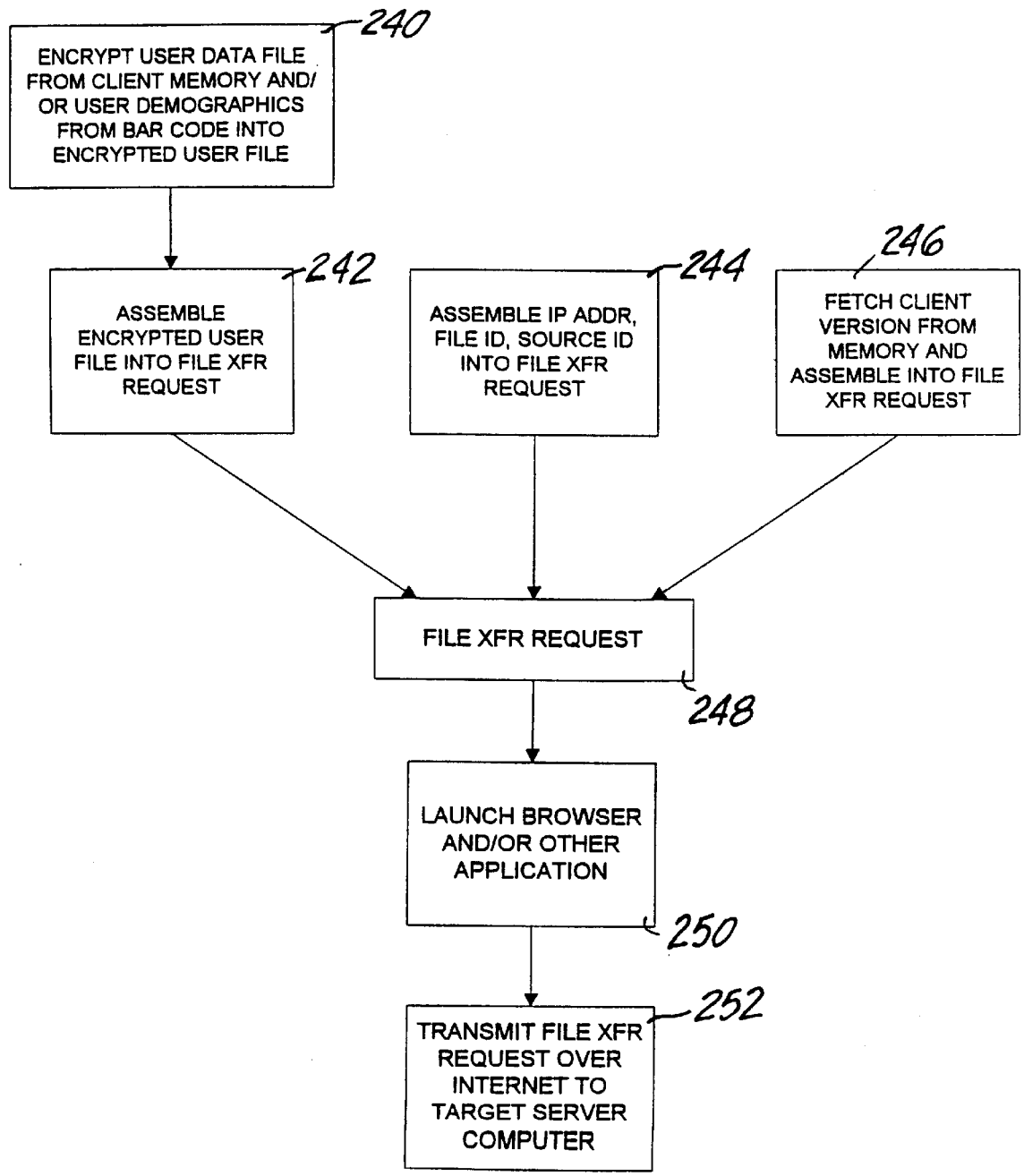

FIGS. 8 and 9 illustrate the detailed operation of the client computer. At step 208 in FIG. 8, the bar code symbol is scanned. At step 218 the input data string is parsed in order to derive the checksum and it is then decrypted with the checksum as the key. The decrypted string is used to computer a checksum and the received checksum is compared with the computed checksum. If the checksums are not equal, an invalid condition is declared and the process exits at step 230. If data is indicated valid at step 232, then the stored code type is fetched from the client's memory at step 234. A comparison of the code type from the client memory with the received code type is compared at step 230. If an invalid data condition is indicated in this test, then the process exits at step 230 and if the code types match, then the process continues with an unpacking of the decrypted string at step 238.

Referring now to FIG. 9, the step 240 will encrypt the user data file from the client memory and optionally the user demographics received from the bar code to generate an encrypted user file. At step 242, the encrypted user file is assembled into the file transfer request 248. At step 244, the file location pointer comprising the IP address and file ID and the source ID are also assembled into the file transfer request and at step 246, the client version is fetched from local memory and assembled into the file transfer request. At step 250, the browser is provided with the file transfer request and is optionally started by the launch command in the received string. At step 252, the file transfer request is transmitted to the target server, preferably in the preferred embodiment over the Internet in order to obtain the requested file.

Figure 10:
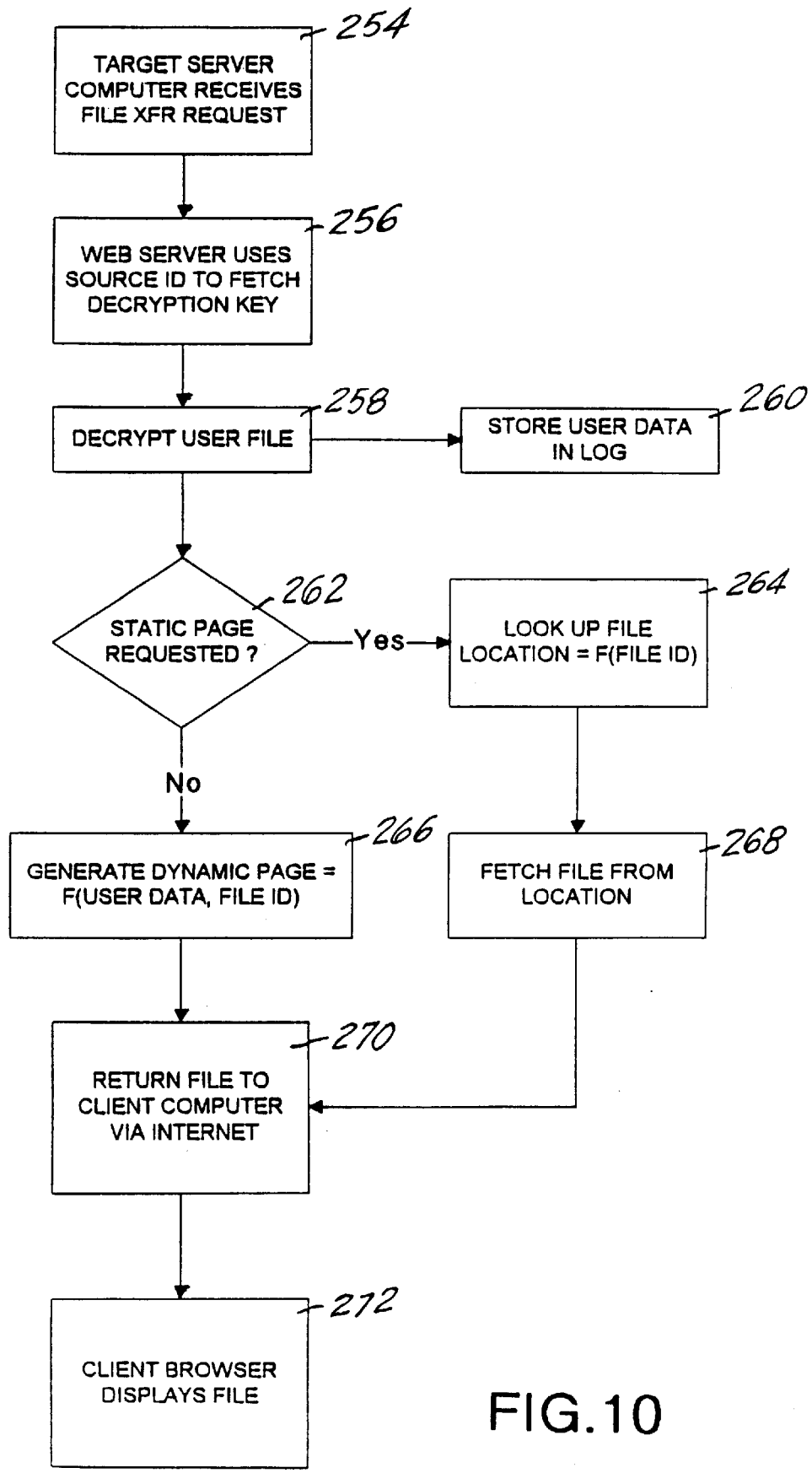
FIG. 10 is a flowchart of method used by the target server computer of the present invention.

FIG. 10 illustrates the details of the methodologies employed by the target server computer. At step 254, the target server computer receives the file transfer request, and at step 256 the Web server program running on the target server computer uses the received source identifier to fetch the associated decryption key which may be internal or externally located. At step 258, the user file is decrypted and the user data is stored in a log. If the static page has been requested by the user, then the file location is looked up as a function of the file identifier. At step 264, the file is fetched from that location at step 268 and returned to the client computer via the Internet at step 270. If the static page was not requested at block 262, then a dynamic page is generated at step 266 which typically will be a function of the file identifier and/or the user data that had been received and decrypted. Again, the file is then returned to the client computer by the Internet and displayed on the user's browser at step 272.

We claim:

1. A method for a client computer to retrieve a computer file comprising the steps of:
   a) encoding a symbol data string comprising a file location pointer into a machine readable symbol;
   b) rendering said machine readable symbol within a data carrier;
   c) transposing an input data string from said machine readable symbol with a computer input device coupled to said client computer;
   d) parsing said input data string to determine said file location pointer; and
   e) utilizing said file location pointer to request the computer file designated thereby.

2. The method of claim 1 wherein said utilization step comprises the steps of:
   passing said file location pointer to an application program on said client computer suitable for processing the corresponding computer file; and
   the application program retrieving the computer file from the specified file location.

3. The method of claim 1 wherein said utilization step comprises the steps of:
   retrieving a copy of the computer file from the specified file location; and
   invoking an application program on said client computer suitable for processing the corresponding computer file.

4. The method of claim 1 wherein said file location pointer specifies the location of a computer file stored in a local memory resident in said client computer, and wherein said computer file is obtained from said local memory.

5. The method of claim 1 wherein said utilization step further comprises the steps of:
   f) assembling a computer file transfer request word comprising said file location pointer, and
   g) transmitting said computer file transfer request word to a target server computer via a computer network system.

6. The method of claim 5 wherein said computer network system is an Internet, and wherein said computer file transfer request word is directed towards a target server computer in communication with the Internet.

7. The method of claim 6 wherein said file location pointer comprises a uniform resource locator (URL) for specifying a file on the target server computer in communication with the Internet.

8. The method of claim 5 wherein said computer network system is a local area network, and wherein said computer file transfer request word is directed towards a target server computer in communication with said local area network.

9. The method of claim 5 further comprising the steps of
h) said target server computer receiving said computer file transfer request word and
i) said target server computer transmitting a computer file to said client computer in response thereto.

10. The method of claim 9 wherein said file location pointer comprises a network address associated with said target server computer and a file identifier correlated to the computer file requested by said client computer.

11. The method of claim 9 wherein said machine readable symbol also has encoded therein a source identifier data string, said source identifier data string comprising data correlated to an expected user of said data carrier, and wherein said source identifier data string is transposed by said computer input device.

12. The method of claim 11 wherein said source transposed source identifier data string is assembled within said computer file transfer request word and transmitted to said target server computer.

13. The method of claim 12 wherein said target server computer stores said source identifier data string received from said client computer in said computer file transfer request word.

14. The method of claim 12 wherein
said machine readable symbol also has encoded therein an encryption key associated with said source identifier data string,
said encryption key is transposed by said computer input device,
said transposed encryption key is used by said client computer to encrypt information specific to a user associated with said client computer, and
said encrypted user information is assembled within said computer file transfer request word and transmitted to said target server computer.

15. The method of claim 14 wherein said information specific to a user is obtained, prior to encryption thereof, from a user information data file stored on said client computer.

16. The method of claim 14 wherein
said machine readable symbol also has encoded therein user demographics data,
said user demographics data correlated to a targeted user of said data carrier,
said user demographics data is transposed by said computer input device, and wherein
said information specific to a user is obtained, prior to encryption thereof, from said transposed user demographics data.

17. The method of claim 14 wherein
said target server computer utilizes said source identifier data string to access a lookup table to determine a decryption key associated with said encryption key, and
said target server decrypts said encrypted user information received from said client computer.

18. The method of claim 17 wherein said lookup table is stored locally on said target server computer.

19. The method of claim 17 wherein said lookup table is stored remotely on a secondary server computer.

20. The method of claim 17 wherein said user information comprises a credit card number associated with said user of said client computer, and wherein on online electronic commercial transaction is accomplished by utilizing said credit card number.

21. The method of claim 9 wherein said machine readable symbol also has encoded therein user demographics data, said user demographics data correlated to a targeted user of said data carrier, and wherein said user demographics data is transposed by said computer input device.

22. The method of claim 21 wherein said user demographics data is included in said file transfer request word transmitted to said target computer, and wherein said user demographics data is stored in said target server computer.

23. The method of claim 22 wherein said computer file transmitted by said target server computer to said client computer is at least partially determined by at least part of said user demographics data.

24. The method of claim 1 wherein said machine readable symbol also has encoded therein an executable command to launch a software utility resident on said client computer, and wherein said software utility is automatically launched after said machine readable symbol is transposed.

25. The method of claim 24 wherein said software utility is an Internet browser program.

26. The method of claim 24 wherein said software utility is a word processing program.

27. The method of claim 26 wherein said word processing program is caused to execute a print command of a computer file.

28. The method of claim 1 wherein
said data carrier is a document,
said machine readable symbol is a bar code symbol,
and said computer input device is a bar code scanning device.

29. The method of claim 28 wherein said bar code symbol is a two-dimensional bar code symbol encoded in the PDF417 symbology.

30. A computer system comprising:
a) a client computer and
b) a computer input device coupled to said client computer, adapted to read a machine readable symbol from a data carrier and transmit to said client computer an input data string;
wherein said client computer comprises
processing means for transposing said input data string to a plurality of constituent fields, said fields comprising at least a file location pointer;
means for utilizing said file location pointer to it request the computer file designated thereby.

31. The computer system of claim 30 wherein said file location pointer utilization means comprises
means for passing said file location pointer to an application program on said client computer suitable for processing the corresponding computer file; and
means for the application program to retrieve the computer file from the specified file location.

32. The computer system of claim 30 wherein said file location pointer utilization means comprises
means for retrieving a copy of the computer file from the specified file location; and
means for invoking an application program on said client computer suitable for processing the corresponding computer file.

33. The computer system of claim 30 wherein said file location pointer utilization means comprises means for obtaining, as a function of said file location pointer, a computer file from local memory resident in said client computer file is obtained from said local memory.

34. The computer system of claim 30 wherein said client computer is interconnected to a computer network comprising a target server computer associated therewith, and wherein said file location pointer utilization means comprises:

means for assembling a computer file transfer request word comprising said file location pointer, and means for transmitting said computer file transfer request word to said target server computer via said network.

35. The computer system of claim 34 wherein said computer network is an Internet, and wherein said computer file transfer request word is directed towards a target server computer in communication with the Internet.

36. The computer system of claim 35 wherein said file location pointer comprises a uniform resource locator (URL) for specifying a file on the target server computer in communication with the Internet.

37. The computer system of claim 34 wherein said computer network is a local area network, and wherein said computer file transfer request word is directed towards a target server computer in communication with said local area network.

38. The computer system of claim 34 wherein said target server computer comprises:

means for receiving said computer file transfer request word; and means for transmitting a computer file to said client computer in response to said computer file transfer request word.

39. The system of claim 38 wherein said file location pointer comprises a network address associated with said target server computer and a file identifier correlated to the computer file requested by said client computer.

40. The computer system of claim 38 wherein said input data string fields also comprise a source identifier data string, said source identifier data string comprising data correlated to an expected user of said data carrier.

41. The system of claim 40 wherein said assembling means also assembles said source identifier data string within said computer file transfer request word.

42. The computer system of claim 44 wherein said target server computer further comprises means for storing said source identifier data string received from said client computer in said computer file transfer request word.

43. The computer system of claim 41 wherein said input data string fields also comprise an encryption key associated with said source identifier data string, and wherein said client computer further comprises means for encrypting with said encryption key a user information data file stored on said client computer, said user information data file comprising information regarding the user associated with said client computer, and wherein said encrypted user information data file is assembled within said computer file transfer request word and transmitted to said target server computer.

44. The computer system of claim 43 wherein said client computer comprises memory means for storing a user information data file, and wherein said information specific to a user is obtained, prior to encryption thereof, from said user information data file.

45. The computer system of claim 43 wherein said input data string fields also comprise user demographics data correlated to a targeted user of said data carrier, and wherein said information specific to a user is obtained, prior to encryption thereof, from said user demographics data.

46. The computer system of claim 45 wherein said target server computer comprises:

means for accessing a lookup table, said lookup table for storing a decryption key associated with said source identifier data string, to obtain said decryption key associated with said source identifier data string, and means for decrypting, utilizing said decryption key, said encrypted user information received from said client computer.

47. The computer system of claim 46 wherein said lookup table is stored locally on said target server computer.

48. The computer system of claim 46 wherein said lookup table is stored remotely on a secondary server computer.

49. The computer system of claim 46 wherein said user information comprises a credit card number associated with said user of said client computer, and wherein said client computer further comprises means for executing on online electronic commercial transaction by utilizing said credit card number.

50. The computer system of claim 38 wherein said input data string fields also comprise user demographics data correlated to a targeted user of said data carrier.

51. The computer system of claim 50 wherein said user demographics data is included in said file transfer request word transmitted to said target computer, and wherein said target server computer comprises means for storing said user demographics data.

52. The computer system of claim 51 wherein said target server computer comprises means for utilizing said user demographics data to at least partially determine the computer file transmitted by said target server computer to said client computer.

53. The computer system of claim 30 wherein said input data string fields also comprise an executable command to launch a software utility resident on said client computer, and wherein said software utility is automatically launched after said machine readable symbol is transposed.

54. The computer system of claim 53 wherein said software utility is an Internet browser program.

55. The computer system of claim 53 wherein said software utility is a word processing program.

56. The computer system of claim 55 wherein said word processing program is caused to execute a print command of a computer file.

57. The computer system of claim 30 wherein said computer input device is a bar code scanning device.

58. The computer system of claim 57 wherein bar code scanning device is suitable for scanning a two-dimensional bar code symbol.

\* \* \* \* \*

UNITED STATES PATENT AND TRADEMARK OFFICE
CERTIFICATE OF CORRECTION

PATENT NO. : 5,933,829                        Page 1 of 3

DATED       : August 3, 1999

INVENTOR(S) : Robert T. Durst, Jr. et al.

It is certified that error appears in the above-identified patent and that said Letters Patent is hereby corrected as shown below:

On the cover page, in the References Cited section, the following references should be added:

5,640,193   06/17/97   Wellner
5,812,776   09/22/98   Gifford
5,764,906   06/09/98   Edelstein
5,804,803   09/08/98   Cragun
5,288,976   02/22/94   Citron et al.
5,519,878   05/21/96   Dolin, Jr.
5,331,547   07/19/94   Laszlo
5,418,713   05/23/95   Allen
5,530,852   06/25/96   Meske, Jr.
5,602,377   02/11/97   Beller et al.
EP 0 837 406 A2   04/22/98
WO97/01137   01/09/97
WO98/03923   01/29/98
WO98/06055   02/12/98
WO98/19259   05/07/98

In Column 3, line 46, change "said" to --from the--.
In Column 3, line 52, change "on" to --an--.
In Column 2, line 52, after "utilized" delete the word "pointer".

In Column 4, line 49, after "computer", insert --32--.
In Column 4, line 51, after "operates", insert --with respect to Figures 1 and 6--.
In Column 4, line 67, after "included in the", insert --data string 20 that is assembled into the--.
In Column 5, line 3, after "a", insert --file location pointer such as a --.
In Column 5, line 5, after "encoded", insert --with encoding function 20--.
In Column 5, line 13, after "text", insert --16--.

UNITED STATES PATENT AND TRADEMARK OFFICE
CERTIFICATE OF CORRECTION

PATENT NO. : 5,933,829

DATED : August 3, 1999

INVENTOR(S) : Robert T. Durst, Jr. et al.

It is certified that error appears in the above-identified patent and that said Letters Patent is hereby corrected as shown below:

In Column 5, line 14, after "graphics", insert --18--; after "document 10" change "a" to --as--.
In Column 5, line 23, after "etc." insert --Thus, as shown in Figure 6, the data string at step 202 is used to generate and distribute at step 204 the intelligent document as desired.--
In Column 5, line 29, after the two instances of "scanner" in sert --34--.
In Column 5, line 37, after "34" insert "(at step 208)"; and after "used" insert --at step 210--.
In Column 5, line 58, delete "code", and replace with --data string 20--.
In Column 6, line 1, after "server" insert --46 and stored in demographics log 42--.
In Column 6, line 2, change "user's" to --users--.
In Column 6, line 5, after "Internet" insert --44--.
In Column 6, line 8, after "routine" insert --38--.
In Column 6, line 10, after "Internet" insert --44.
In Column 6, line 24, change "10" to --100--.
In Column 6, line 43, after "drive" insert --94--.

In the claims:
Delete Claim 1 in its entirety and replace it with the following:
1. A method for a client computer to retrieve a computer file comprising the steps of:
(a) obfuscating a symbol data string comprising a file location pointer by:
computing a checksum of said symbol data string; encrypting said symbol data string by utilizing said checksum as an encryption key; and assembling said checksum with said encrypted symbol data string;
(b) encoding said obfuscated symbol data string into a machine readable symbol;
(c) rendering said machine readable symbol within a data carrier;
(d) transposing an input data string from said machine readable symbol with a computer input device coupled to said client computer;
(e) de-obfuscating said input data string to determine said file location pointer in accordance with a program stored in said client computer by: parsing said input data string to determine said checksum; decrypting said encrypted symbol data string with said checksum as a decryption key; computing a checksum of said decrypted symbol data string; comparing said computed checksum with said

UNITED STATES PATENT AND TRADEMARK OFFICE
CERTIFICATE OF CORRECTION

PATENT NO. : 5,933,829

DATED : August 3, 1999

INVENTOR(S) : Robert T. Durst, Jr. et al.

It is certified that error appears in the above-identified patent and that said Letters Patent is hereby corrected as shown below:

checksum from said input data string; indicating a valid data condition when said comparison step is successful; and indicating an invalid data condition when said comparison step is unsuccessful; and
(f) utilizing said determined file location pointer to request the computer file designated thereby.
In Column 10, Claim 5, line 53, change "(f)" to --(g)--.
In Column 10, Claim 5, line 55, change "(g) to --(h)--.
In Column 11, Claim 9, line 4, change "(h)" to --(i)--; and change "(i)" to --(j)--.
In Column 11, Claim 20, line 65, change "on" to --an--.
In Column 12, Claim 30, line 42, delete the text starting with "processing means" and ending with "designated thereby." and replace it with the following:
-- means for de-obfuscating said input data string to determine a file location pointer in accordance with a program stored in said client computer; comprising means for parsing said input data string to determine a checksum; means for decrypting the remainder of said input data string with said checksum as a decryption key, at least a portion of said decrypted input data string comprising said file location pointer; means for computing a checksum of said decrypted string; means for comparing said computed checksum with said checksum from said input data string; and means for indicating a valid data condition when said comparison step is successful; and means for utilizing said file location pointer to request the computer file designated thereby.--
In Column 13, Claim 42, line 40, change "44" to --41--.

Signed and Sealed this

Twenty-eighth Day of March, 2000

*Attest:*

Q. TODD DICKINSON

*Attesting Officer*  *Commissioner of Patents and Trademarks*